(12) United States Patent
Aoki

(10) Patent No.: US 11,407,146 B2
(45) Date of Patent: Aug. 9, 2022

(54) CENTRIFUGAL FIELD-FLOW FRACTIONATION DEVICE

(71) Applicant: SHIMADZU CORPORATION, Kyoto (JP)

(72) Inventor: Kengo Aoki, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 496 days.

(21) Appl. No.: 16/471,938

(22) PCT Filed: Dec. 22, 2016

(86) PCT No.: PCT/JP2016/088336
§ 371 (c)(1),
(2) Date: Jun. 20, 2019

(87) PCT Pub. No.: WO2018/116441
PCT Pub. Date: Jun. 28, 2018

(65) Prior Publication Data
US 2020/0001505 A1 Jan. 2, 2020

(51) Int. Cl.
*B29B 17/02* (2006.01)
*B03B 5/28* (2006.01)

(52) U.S. Cl.
CPC .............. *B29B 17/02* (2013.01); *B03B 5/28* (2013.01); *B29B 2017/0244* (2013.01)

(58) Field of Classification Search
CPC ... B29B 17/02; B29B 2017/0244; B03B 5/28; B04B 5/0442; B04B 9/146; B04B 2005/045
See application file for complete search history.

(56) References Cited

U.S. PATENT DOCUMENTS

| 2012/0234731 A1 | 9/2012 | Senftleber |
| 2014/0066280 A1 | 3/2014 | Welz |
| 2015/0038311 A1* | 2/2015 | Letourneur ............... B04B 9/14 494/9 |

FOREIGN PATENT DOCUMENTS

| JP | 4-122655 U | 11/1992 |
| JP | 5-104031 A | 4/1993 |
| JP | 6-34749 U | 5/1994 |
| JP | 3021103 U | 11/1995 |
| JP | 2014-518761 A | 8/2014 |

OTHER PUBLICATIONS

Written Opinion for PCT/JP2016/088336 dated Feb. 7, 2017 [PCT/ISA/237].
International Search Report for PCT/JP2016/088336 dated Feb. 7, 2017 [PCT/ISA/237].

* cited by examiner

*Primary Examiner* — Michael McCullough
*Assistant Examiner* — Kalyanavenkateshware Kumar
(74) *Attorney, Agent, or Firm* — Sughrue Mion, PLLC

(57) ABSTRACT

A centrifugal field-flow fractionation device 1 includes a rotation unit 10, a rotation sensor 41, a first vibration sensor 51, a second vibration sensor 52, and an imbalance amount calculation unit 312. When an imbalance occurs in the rotation unit 10, the imbalance amount calculation unit 312 calculates the imbalance amount, based on a detection signal from the rotation sensor 41, a detection signal from the first vibration sensor 51, and a detection signal from the second vibration sensor 52. That is, when an imbalance occurs in the rotation unit 10, the imbalance is calculated by the configuration in the centrifugal field-flow fractionation device 1.

8 Claims, 7 Drawing Sheets

CENTRIFUGAL FIELD-FLOW FRACTIONATION DEVICE

TECHNICAL FIELD

The present invention relates to a centrifugal field-flow fractionation device that causes a liquid sample to flow into a channel of a channel member provided in an annular rotor and causes the rotor to rotate so that particles in the liquid sample in the channel are classified by centrifugal force.

BACKGROUND ART

Field flow fractionation has been known as a method for classifying particles contained in a liquid sample according to the specific gravity. For example, Patent Document 1 below discloses an example of a centrifugal field-flow fractionation device that classifies particles in a liquid sample by centrifugal force by causing the liquid sample to flow into a channel and rotating the channel.

The centrifugal field-flow fractionation device includes, for example, a rotor and a channel member. The rotor is formed into an annular shape, and is rotatably held about a rotational axis. The channel member is provided on the rotor, and an arc-shaped channel extending along the inner peripheral surface of the rotor is formed inside the channel member.

In this type of centrifugal field-flow fractionation device, by rotating the rotor, the channel member can be rotated to apply centrifugal force to the liquid sample in the channel. As a result, particles in the liquid sample can be classified according to specific gravity.

In addition, usually, in this type of centrifugal field-flow fractionation device, imbalance occurs in a rotation unit including a rotor and a channel member due to errors in processing and assembly. If the rotation unit is rotated while the imbalance occurs in the rotation unit, vibration and noise are generated. Therefore, in the centrifugal field-flow fractionation device, the imbalance of the rotation unit is corrected in advance after assembly.

PRIOR ART DOCUMENT

Patent Document

Patent Document 1: Japanese Translation of PCT International Application Publication No. JP-T-2014-518761

SUMMARY OF THE INVENTION

Problems to be Solved by the Invention

In the conventional centrifugal field-flow fractionation device as described above, there has been a problem that additional cost and work are required in order to cope with imbalance caused by use of the centrifugal field-flow fractionation device. More specifically, in a conventional centrifugal field-flow fractionation device as described above, there is a case where a channel member is replaced depending on the type of liquid sample. If the channel member is replaced, a new imbalance occurs in the rotation unit of the centrifugal field-flow fractionation device. Similarly, the type of liquid flowing in the channel member may be changed depending on the particles to be analyzed, and in this case, an imbalance occurs due to a difference in the density of the liquid in the channel member. In addition, imbalance may occur in the rotation unit due to deterioration of each member of the rotation unit. In such a case, it is necessary to prepare a dedicated device separately or to carry out the work by a professional worker in order to measure and correct the newly generated imbalance amount.

The present invention has been made in view of the above circumstances, and it is an object of the present invention to provide a centrifugal field-flow fractionation device capable of easily calculating an imbalance amount without requiring a separate device or worker when an imbalance occurs in a rotation unit.

Means for Solving the Problems (1) A centrifugal field-flow fractionation device according to the present invention includes a rotation unit, a first detection unit, a second detection unit, and an imbalance amount calculation unit. The rotation unit includes a rotor and a channel member. The rotor has an annular shape and rotates about a rotational axis. The channel member is provided in the rotor, and has therein a channel in which a liquid sample flows. The first detection unit detects the rotational speed of the rotation unit. The second detection unit detects a vibration of the rotation unit. The imbalance amount calculation unit calculates the imbalance amount of the rotation unit, based on a detection signal of the first detection unit and a detection signal of the second detection unit.

According to such a configuration, when imbalance occurs in the rotation unit, the imbalance amount calculation unit can calculate the imbalance amount, based on the detection signal of the first detection unit and the detection signal of the second detection unit. That is, when imbalance occurs in the rotation unit, the imbalance amount can be calculated by the configuration in the centrifugal field-flow fractionation device.

Therefore, the imbalance amount can be easily calculated by the centrifugal field-flow fractionation device alone without requiring a separate device or worker.

(2) The imbalance amount calculation unit may calculate the imbalance amount of the rotation unit, based on a phase obtained from the detection signal of the first detection unit and an amplitude obtained from the detection signal of the second detection unit.

According to such a configuration, the imbalance amount can be accurately calculated based on the phase and the amplitude of the rotation unit.

That is, from the relationship between the phase and the amplitude of the rotation unit, the imbalance position and amount in the rotation unit can be specified with high accuracy.

(3) The imbalance amount calculation unit may calculate the imbalance amount of the rotation unit by performing matrix calculation using an influence coefficient matrix.

According to such a configuration, the imbalance amount calculation unit can calculate the imbalance amount more accurately.

That is, by performing matrix operation using the influence coefficient matrix on a matrix representing the relationship between the phase and the amplitude of the rotation unit, the imbalance position and amount in the rotation unit can be specified with higher accuracy.

(4) The centrifugal field-flow fractionation device may further include a storage unit. The storage unit stores an influence coefficient matrix in advance. The imbalance amount calculation unit may calculate the imbalance amount of the rotation unit by reading the influence coefficient matrix from the storage unit and performing matrix calculation.

According to such a configuration, the imbalance amount calculation unit calculates the imbalance amount on the basis of the influence coefficient matrix stored in advance in the storage unit.

Therefore, it is not necessary to perform the operation for calculating the influence coefficient matrix every time the imbalance calculation is performed, and the calculation performed by the imbalance amount calculation unit can be simplified.

(5) The centrifugal field-flow fractionation device may further include a display unit and a display control unit. The display control unit causes the display unit to display, based on an imbalance amount calculated by the imbalance amount calculation unit, correction information of the imbalance amount.

According to such a configuration, the user is allowed to appropriately recognize the correction information of the imbalance amount.

Therefore, the user can easily suppress the generation of vibration and noise by performing the work of correcting the imbalance amount according to the correction information.

(6) The centrifugal field-flow fractionation device may further include a notification control. When the imbalance amount calculated by the imbalance amount calculation unit exceeds a first threshold value, the notification control unit notifies that the imbalance amount calculated by the imbalance amount calculation unit exceeds the first threshold value.

According to such a configuration, the imbalance amount of the rotation unit can be monitored, and when the imbalance amount exceeds an abnormal value (first threshold value), the user is allowed to appropriately recognize that.

Therefore, the user can easily suppress the generation of vibration and noise by correcting the imbalance amount according to the notification.

(7) The centrifugal field-flow fractionation device may further include a rotation control unit. The rotation control unit stops the rotation of the rotation unit when the imbalance amount calculated by the imbalance amount calculation unit exceeds a second threshold value.

According to such a configuration, the imbalance amount of the rotation unit can be monitored, and when the imbalance amount exceeds a dangerous value (second threshold value), the rotation of the rotation unit can be automatically stopped.

Therefore, it is possible to suppress the rotation of the rotation unit while the imbalance amount is very large, and to suppress the rotation unit from being damaged.

(8) The first detection unit may include at least one rotation sensor that detects a rotational speed of the rotation unit. The second detection unit may include at least one vibration sensor that detects a vibration of the rotation unit. The imbalance amount calculation unit may calculate a static imbalance amount of the rotation unit, based on a detection signal detected by the rotation sensor and a detection signal detected by the vibration sensor.

According to such a configuration, the static imbalance amount of the rotation unit can be simply calculated by the imbalance amount calculation unit. That is, since the centrifugal field-flow fractionation device is provided with at least one rotation sensor and at least one vibration sensor in many cases, when such a device is used, there is no need to add a separate part, and the static imbalance amount of the rotation unit can be simply calculated.

(9) The first detection unit may include at least one rotation sensor that detects a rotational speed of the rotation unit. The second detection unit may include at least two vibration sensors that detect vibration of the rotation unit. The imbalance amount calculation unit may calculate a dynamic imbalance amount of the rotation unit, based on a detection signal detected by the rotation sensor and a detection signal detected by the vibration sensor.

According to such a configuration, the dynamic imbalance amount of the rotation unit can be simply calculated by the imbalance amount calculation unit.

That is, not only the static imbalance amount but also the dynamic imbalance amount of the rotation unit can be calculated by a simple configuration in which at least two vibration sensors are provided.

Effects of the Invention

According to the present invention, when an imbalance occurs in the rotation unit, the imbalance amount can be calculated by the configuration in the centrifugal field-flow fractionation device, so that the imbalance amount can be simply calculated without requiring a separate device or worker.

MODE FOR CARRYING OUT THE INVENTION

1. Analysis System Configuration

Figure 1:
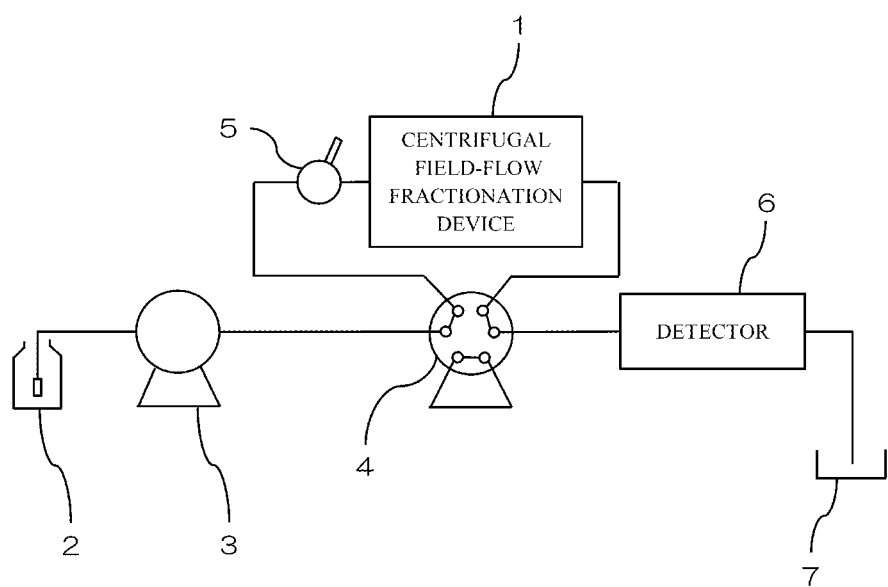
FIG. 1 is a schematic view showing a configuration example of an analysis system provided with a centrifugal field-flow fractionation device according to a first embodiment of the present invention.

FIG. 1 is a schematic view showing a configuration example of an analysis system provided with a centrifugal field-flow fractionation device 1 according to a first embodiment of the present invention. The centrifugal field-flow fractionation device 1 classifies particles contained in a liquid sample according to their specific gravity by using field flow fractionation. The analysis system shown in FIG. 1 includes a carrier storage unit 2, a liquid feed pump 3, a rotary valve 4, a sample injection device 5, a detector 6, and a carrier collection unit 7, in addition to the centrifugal field-flow fractionation device 1.

The carrier storage unit 2 stores a carrier fluid made of, for example, water or an organic solvent. The carrier fluid is fed from the carrier storage unit 2 by the liquid feed pump 3, and is supplied to the centrifugal field-flow fractionation device 1 via the rotary valve 4. The sample injection device 5 is provided between the rotary valve 4 and the centrifugal field-flow fractionation device 1, and the carrier fluid injected with the sample from the sample injection device 5 is supplied to the centrifugal field-flow fractionation device 1 as a liquid sample.

The liquid sample contains a large number of particles to be analyzed. The particles contained in the liquid sample are classified by applying a centrifugal force in the centrifugal field-flow fractionation device 1, and are discharged from the centrifugal field-flow fractionation device 1 at different timings according to the specific gravity. The particles flowing out sequentially from the centrifugal field-flow fractionation device 1 are sent to the detector 6 together with the carrier fluid via the rotary valve 4, and after being detected by the detector 6, they are collected by the carrier collection unit 7. The start or stop of the supply of the liquid sample to the centrifugal field-flow fractionation device 1 can be switched by rotating the rotary valve 4.

2. Configuration of Centrifugal Field-Flow Fractionation Device

Figure 2:
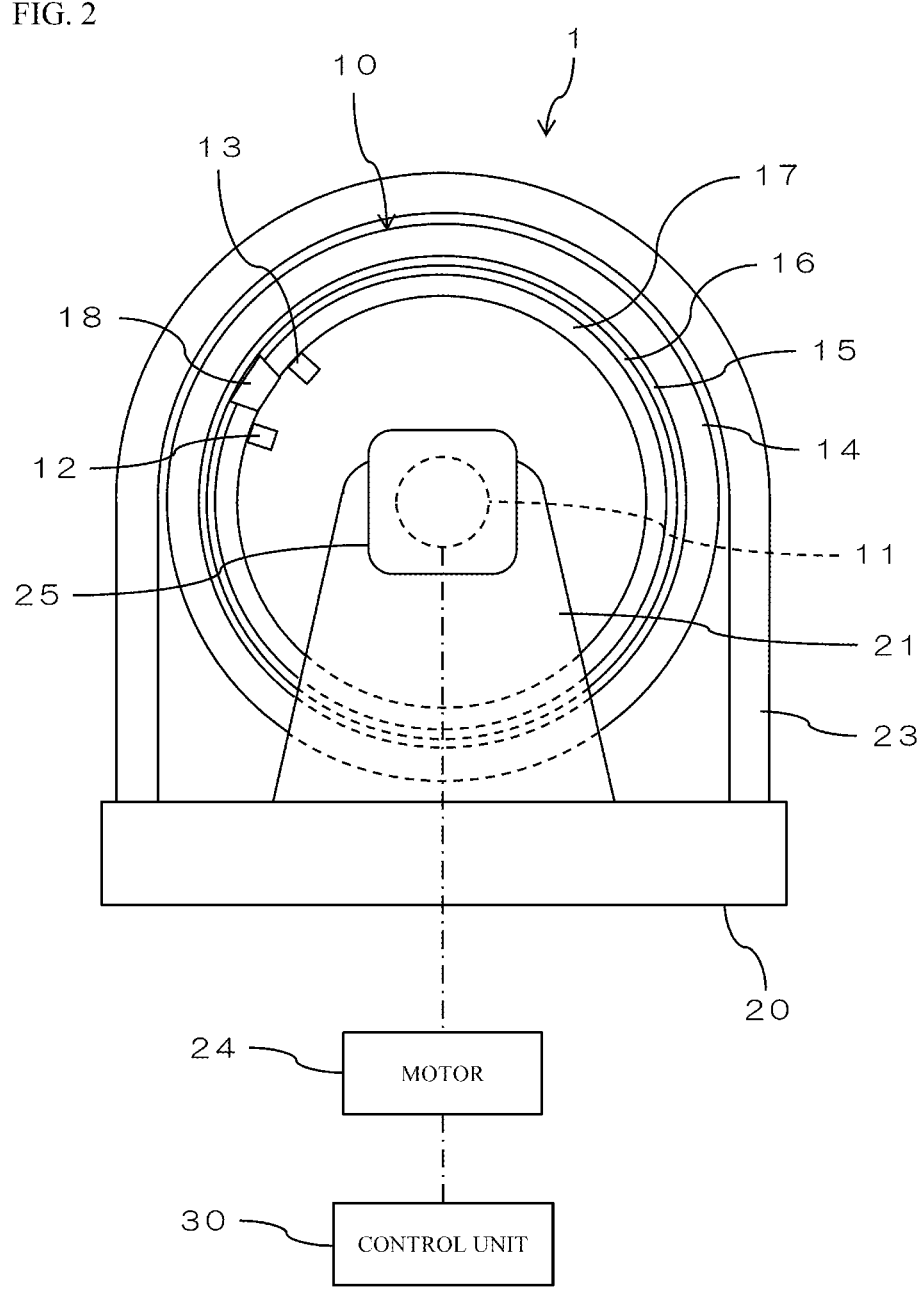
FIG. 2 is a schematic front view showing a configuration example of the centrifugal field-flow fractionation device of FIG. 1.

FIG. 2 is a schematic front view showing a configuration example of the centrifugal field-flow fractionation device 1. The centrifugal field-flow fractionation device 1 is constituted by assembling a rotation unit 10 that rotates about a rotational shaft 11, a holding table 20 that rotatably holds the rotational shaft 11, and a protective wall 23 that prevents an operator from contacting the rotation unit 10 during rotation.

The rotation unit 10 is formed in a cylindrical shape, for example, and is held by the holding table 20 so that the rotational shaft 11 attached to the center portion thereof extends horizontally. A pair of holding plates 21 extending in the vertical direction are provided in parallel at an interval with each other on the holding table 20. The rotation unit 10 is disposed between the pair of holding plates 21, and the rotational shaft 11 is rotatably held by the holding plates 21. A fixing portion 25 is fixed to the holding plate 21, and the end face of the rotational shaft 11 is covered with the fixing portion 25. The protective wall 23 is, for example, a U-shaped member curved in a shape corresponding to the outer peripheral surface of the rotation unit 10, and is mounted on the holding table 20 in a state of facing each other across a small interval with respect to the outer peripheral surface so as to cover the outer peripheral surface of the rotation unit 10.

The rotational shaft 11 is formed in a hollow shape, and a liquid sample is supplied into the rotational shaft 11 from, for example, one end of the rotational shaft 11. The rotation unit 10 is provided with an introduction unit 12 into which the liquid sample before classification is introduced, and a discharge unit 13 from which the liquid sample after classification is discharged. The introduction unit 12 and the discharge unit 13 communicate with each other into the rotational shaft 11 via a pipe (not shown). Thus, the liquid sample supplied into the rotational shaft 11 is introduced into the rotation unit 10 from the introduction unit 12 via the pipe, and after the particles in the sample liquid are classified in the rotation unit 10, the liquid sample is guided to the rotational shaft 11 via the pipe from the discharge unit 13 and sent to the detector 6.

A motor 24, which is an example of a rotation drive unit, is connected to the rotational shaft 11. By driving the motor 24, the rotation unit 10 is rotated to apply a centrifugal force to the liquid sample in the rotation unit 10. The driving of the motor 24 is controlled by a control unit 30 including, for example, a CPU (Central Processing Unit). However, the rotation unit 10 can also be rotated by using a rotation drive unit other than the motor 24.

3. Configuration of Rotation Unit

Figure 3:
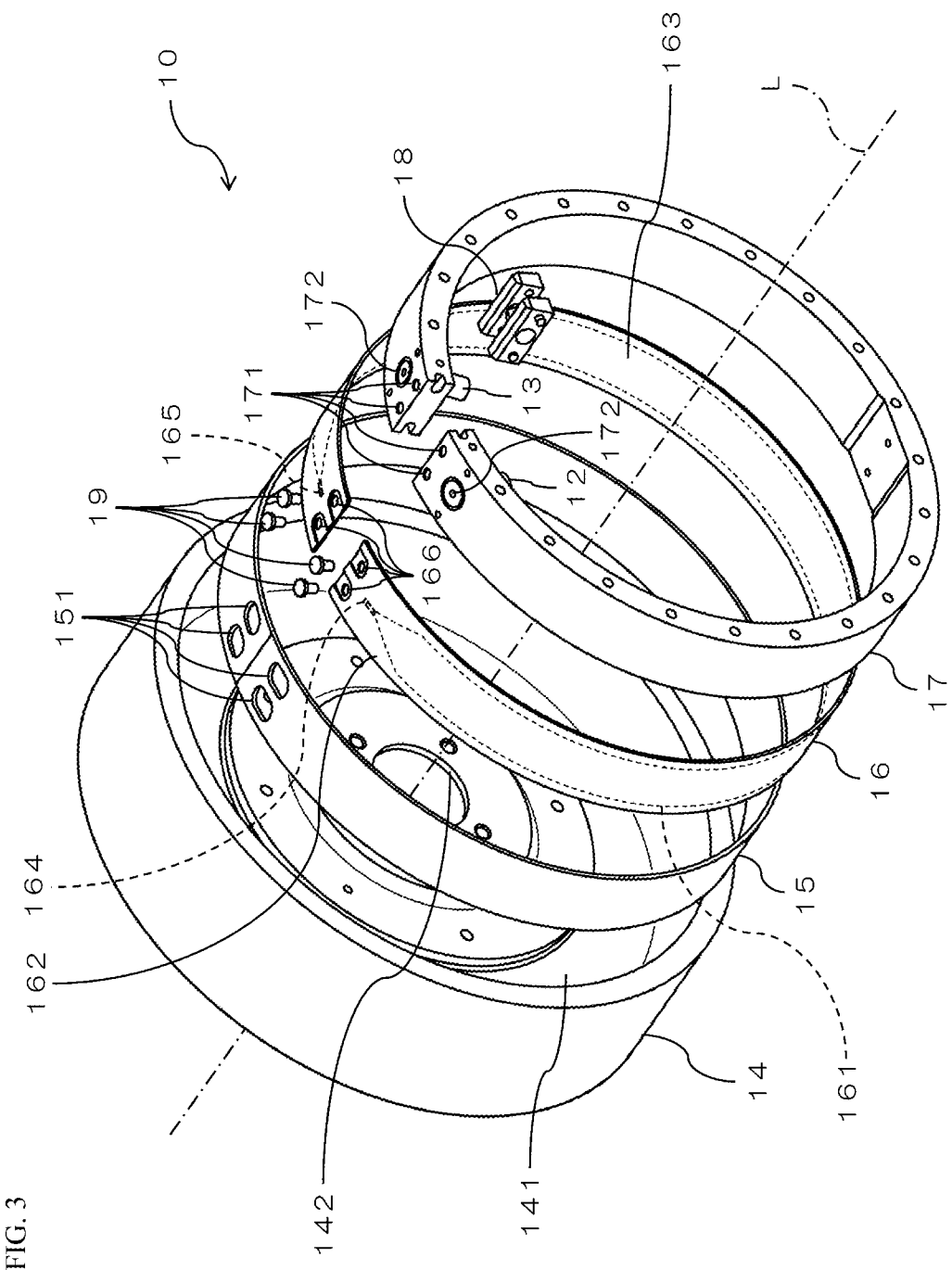
FIG. 3 is an exploded perspective view showing a configuration example of a rotation unit of FIG. 2.

FIG. 3 is an exploded perspective view showing a configuration example of the rotation unit 10. The rotation unit 10 is configured as a cylindrical member as a whole by assembling, for example, a rotor 14, a spacer 15, a channel member 16, a fixing member 17, a wedge-shaped member 18, and the like.

The rotor 14 is an annular member, and one end face thereof is closed by an end face wall 141. The end face wall 141 is formed in a disk shape, and has an insertion hole 142 for receiving the rotational shaft 11 in the central portion thereof. By inserting the rotational shaft 11 into the insertion hole 142 and fixing it to the end face wall 141, the rotor 14 can be rotated about a rotational axis L coaxial with the rotational shaft 11 as the rotational shaft 11 rotates.

The spacer 15, the channel member 16, the fixing member 17, and the wedge-shaped member 18 are accommodated in a space inside (the rotational axis L side) the rotor 14. Each of the spacer 15, the channel member 16, and the fixing member 17 has a shape in which an elongated member is curved in an arc shape, and is fixed along the inner peripheral surface of the rotor 14 in a state of being laminated in this order. The radii of curvature of the spacer 15, the channel member 16, and the fixing member 17 are, for example, about 50 to 200 mm.

The channel member 16 is, for example, a thin plate with a thickness of 1 mm or less, and is formed into a C shape by both end portions in the circumferential direction facing each other across an interval. A channel 161 extending in the circumferential direction is formed in the channel member 16. That is, the channel member 16 has an arc-shaped outer peripheral surface 162 formed on the rotor 14 side and an arc-shaped inner peripheral surface 163 formed on the rotational axis L side, and the channel 161 is formed between the outer peripheral surface 162 and the inner peripheral surface 163.

An inlet 164 for the liquid sample to the channel 161 is formed at one circumferential end of the inner peripheral surface 163 of the channel member 16. On the other hand, an outlet 165 for the liquid sample from the channel 161 is formed at the other circumferential end of the inner peripheral surface 163 of the channel member 16. Accordingly, the liquid sample flowing into the channel 161 from the inlet 164 circulates in the channel 161 along the circumferential direction from one end to the other end, and flows out from the outlet 165.

When the particles in the liquid sample are classified, first, the rotation unit 10 is rotated by driving of the motor 24, and the rotational speed of the rotation unit 10 is gradually increased. When the rotational speed of the rotation unit 10 reaches a certain value (for example, 5000 rpm), the liquid sample is injected from the inlet 164 while the rotational speed is maintained.

After the liquid sample is injected into the channel 161 for a certain period of time, the supply of the liquid sample is stopped by switching of the rotary valve 4, and the rotation unit 10 is rotated as it is. Consequently, the particles in the liquid sample in the channel 161 are centrifugally precipitated. Thereafter, the supply of the liquid sample is resumed by the switching of the rotary valve 4, and the rotational speed of the rotation unit 10 is gradually lowered after a predetermined period of time.

As a result, particles, in ascending order of specific gravity in the liquid sample, are sequentially sent downstream along the flow of the liquid sample in the channel 161, and flow out sequentially from the outlet 165. In this way, the particles in the liquid sample in the channel 161 are classified by centrifugal force, flow out from the outlet 165 at different timings according to the specific gravity, and are sent to the detector 6.

The fixing member 17 is a member having a thickness larger than that of the channel member 16, and is formed to have a thickness of about 10 mm, for example. Similar to the channel member 16, the fixing member 17 is formed into a C-shape by the both circumferential end portions facing each other across an interval. The circumferential length of the fixing member 17 is substantially the same as the circumferential length of the channel member 16. The fixing member 17 is provided inside (the rotational axis L side) the channel member 16 along the inner peripheral surface 163 of the channel member 16.

A plurality of screw holes 171 for receiving a bolt 19, which is an example of a locking tool, are formed at both circumferential end portions of the fixing member 17. A plurality of insertion holes 166 are formed at both circumferential end portions of the channel member 16 at positions facing the respective screw holes 171 of the fixing member 17. Thus, the bolt 19 is inserted into each of the insertion holes 166 from the outside and screwed into each of the screw holes 171. Thus, the channel member 16 can be attached to the fixing member 17. However, the locking tool is not limited to the bolt 19, and may be constituted by another member such as a pin.

Through holes 172 are formed at respective circumferential end portions of the fixing member 17 at positions facing the inlet 164 and the outlet 165 that are formed on the inner peripheral surface 163 of the channel member 16. The introduction unit 12 and the discharge unit 13 are attached to the inner peripheral surface of the fixing member 17 so as to communicate with the respective through holes 172. As a result, the liquid sample introduced from the introduction unit 12 flows into the channel 161 from the inlet 164 via one of the through holes 172, circulates in the channel 161 in the circumferential direction, and then is discharged from the outlet 165 via the other through hole 172 and the discharge unit 13.

The channel 161 in the channel member 16 is set to a different height depending on the type of the carrier fluid, the condition of the analysis, and the like. Therefore, the channel member 16 is formed to have a different thickness in accordance with the height of the channel 161, and an optimum channel member 16 is selected from a plurality of types of channel member 16 and attached to the fixing member 17.

The fixing member 17 to which the channel member 16 is attached as described above is inserted into a space inside the rotor 14 and fixed along the inner peripheral surface of the rotor 14 so as to sandwich the channel member 16 between the rotor 14 and the fixing member 17. At this time, by attaching the wedge-shaped member 18 between both end portions of the C-shaped fixing member 17, a force is applied in a direction in which the both end portions are expanded.

As a result, the C-shaped fixing member 17 is strongly pressed against the inner peripheral surface side of the rotor 14, and the channel member 16 is pressed against and fixed to the rotor 14 side. When the particles in the liquid sample are classified, the inside of the channel 161 becomes high pressure (for example, about 1 MPa) due to the high-speed rotation of the rotor 14, and the pressure difference between the inside and the outside of the channel 161 increases. However, by sandwiching the channel member 16 between the fixing member 17 and the rotor 14, the outer peripheral surface 162 and the inner peripheral surface 163 of the channel member 16 can be prevented from being deformed to the side opposite to the channel 161 side by the pressure difference.

In this embodiment, the spacer 15 is sandwiched between the channel member 16 and the rotor 14. The material of the spacer 15 is not particularly limited, but is formed of, for example, a resin such as PET (Polyethylene Terephthalate) or metal. The spacer 15 is formed to be slightly longer than the channel member 16, and long holes 151 are formed at both circumferential end portions of the spacer 15 at positions facing the respective insertion holes 166 of the channel member 16.

The head of the bolt 19 inserted into each of the insertion holes 166 of the channel member 16 is accommodated in each of the long holes 151 of the spacer 15. Each of the long holes 151 is formed to extend in the circumferential direction. Thus, when both end portions of the fixing member 17 are expanded by the wedge-shaped member 18 and the fixing member 17 is strongly pressed against the inner peripheral surface side of the rotor 14 while the head of each of the bolts 19 is accommodated in the respective long holes 151, the spacer 15 and the channel member 16 are sandwiched between the fixing member 17 and the rotor 14 while the head of each of the bolts 19 slides in the circumferential direction in the respective long holes 151.

The spacer 15 is, for example, a thin plate with a thickness of 1 mm or less, and a spacer with a different thickness according to the thickness of the channel member 16 is selected. That is, the spacer 15 having the optimum thickness is selected so that the total value of the thickness of the spacer 15 and the thickness of the channel member 16 is substantially constant. The spacer 15 also has a function of preventing damage to the inner peripheral surface of the rotor 14. However, the spacer 15 can be omitted.

4. Configuration of Rotation Sensor, Vibration Sensor, and Rotor

Figure 4:
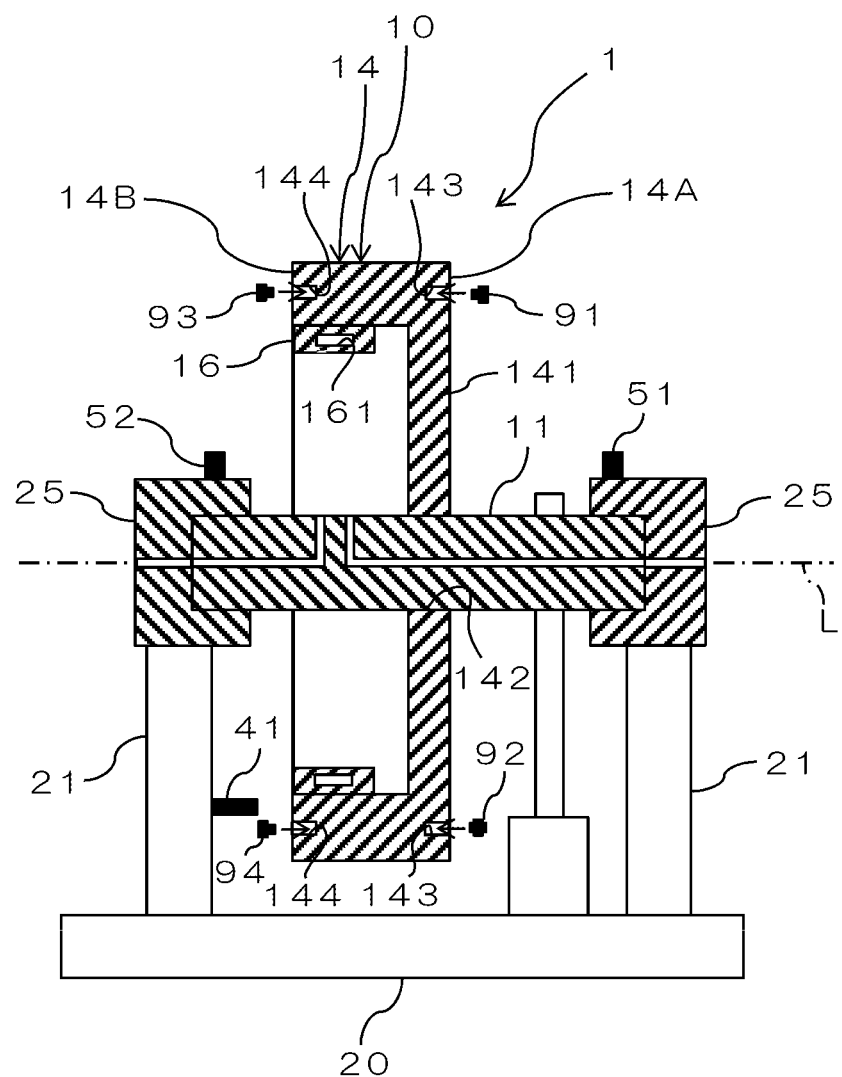
FIG. 4 is a side sectional view showing the configuration example of the centrifugal field-flow fractionation device of FIG. 1.

FIG. 4 is a side sectional view showing the configuration example of the centrifugal field-flow fractionation device 1. In FIG. 4, the spacer 15, the fixing member 17, and the protective wall 23 are omitted.

The centrifugal field-flow fractionation device 1 includes a rotation sensor 41, a first vibration sensor 51, and a second vibration sensor 52. However, the number of the rotation sensors 41 is not limited to one, and at least one may be provided. The number of the vibration sensors 51 and 52 is not limited to two, and at least two may be provided.

The rotation sensor 41 is provided on the holding plate 21. Specifically, the rotation sensor 41 is provided on the holding plate 21, which faces a space inside the rotor 14, of the pair of holding plates 21. The rotation sensor 41 faces an end surface of the rotor 14 in the direction of the rotational axis L. The rotation sensor 41 is, for example, an optical sensor, and detects the rotational speed of the rotor 14 (rotation unit 10). Specifically, a reflection seal (not shown)

is attached to a predetermined position of the end face of the rotor 14. The rotation sensor 41 detects the rotational speed of the rotor 14 by detecting the reflected light of the light applied onto the reflection seal.

The first vibration sensor 51 is provided on one fixing portion 25 of the pair of fixing portions 25. Specifically, the first vibration sensor 51 is provided on the fixing portion 25, which faces the end face wall 141, of the rotor 14.

The second vibration sensor 52 is provided on the other fixing portion 25 of the pair of fixing portions 25. Specifically, the second vibration sensor 52 is provided on the fixing portion 25, which faces the space inside the rotor 14, of the pair of fixing portions 25. That is, in the direction of the rotational axis L, the rotation unit 10 is disposed between the first vibration sensor 51 and the second vibration sensor 52.

The first vibration sensor 51 and the second vibration sensor 52 are, for example, acceleration sensors, speed sensors, or displacement sensors, and detect the vibration of the fixing portion 25 by detecting acceleration, speed, or displacement associated with the vibration of the fixing portion 25. The fixing portion 25 rotatably holds the rotational shaft 11, and the rotation unit 10 is attached to the rotational shaft 11. The rotation unit 10, the rotational shaft 11, and the fixing portion 25 vibrate together. That is, the first vibration sensor 51 and the second vibration sensor 52 detect the vibration of the rotation unit 10 by detecting the vibration of the fixing portion 25.

In the centrifugal field-flow fractionation device 1, a plurality of first holes 143 are formed at intervals along the circumferential direction on one end face 14A of the rotor 14 in the direction of the rotational axis L, and a plurality of second holes 144 are formed at intervals along the circumferential direction on the other end face 14B of the rotor 14 in the direction of the rotational axis L. A first test weight 91 or a first correction weight 92 can be attached to each of the first holes 143, and a second test weight 93 or a second correction weight 94 can be attached to each of the second holes 144. Each of the first holes 143 and each of the second holes 144 are, for example, screw holes, and the first test weight 91, the first correction weight 92, the second test weight 93, and the second correction weight 94 are, for example, screws whose weights are known. However, the configuration is not limited to that in which the first test weight 91, the first correction weight 92, the second test weight 93, and the second correction weight 94 are attached to the rotor 14, and they may be attached to other members constituting the rotation unit 10 such as the fixing member 17. The first test weight 91, the first correction weight 92, the second test weight 93, and the second correction weight 94 may not limited to be constituted by screws but may be constituted by other members such as pins as long as they can be attached to the rotation unit 10.

In the centrifugal field-flow fractionation device 1, the motor 24 is controlled so that the rotational speed of the rotation unit 11 detected by the rotation sensor 41 is maintained at a set value during normal operation. When the vibration of the rotation unit 11 detected by the first vibration sensor 51 or the second vibration sensor 52 becomes equal to or larger than a predetermined value, the motor 24 is stopped.

Then, as will be described later, in the centrifugal field-flow fractionation device 1, the imbalance amount of the rotation unit 10 is calculated using the rotation sensor 41, the first vibration sensor 51, and the second vibration sensor 52. When the imbalance amount of the rotation unit 10 is calculated, the first test weight 91 is attached to each of the first holes 143, and the second test weight 93 is attached to each of the second holes 144. When the imbalance of the rotation unit 10 is to be corrected, the first correction weight 92 is attached to each of the first holes 143, and the second correction weight 94 is attached to each of the second holes 144.

Figure 5:
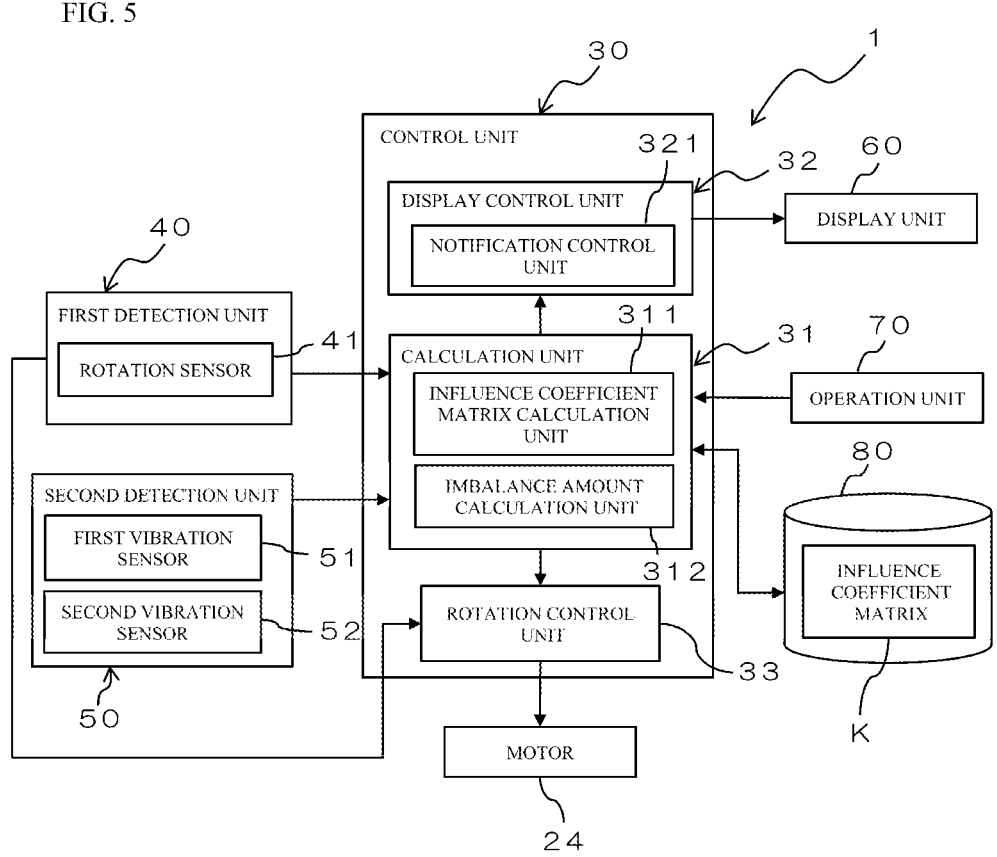
FIG. 5 is a block diagram showing a specific configuration around a control unit of the centrifugal field-flow fractionation device of FIG. 1.

5. Specific Configuration Around Control Unit of Centrifugal Field-Flow Fractionation Device FIG. 5 is a block diagram showing a specific configuration around the control unit 30 of the centrifugal field-flow fractionation device 1.

The centrifugal field-flow fractionation device 1 includes a first detection unit 40, a second detection unit 50, a display unit 60, an operation unit 70, a storage unit 80, the control unit 30, and the motor 24.

The first detection unit 40 is configured of the rotation sensor 41 described above.

The second detection unit 50 is configured of the first vibration sensor 51 and the second vibration sensor 52 described above.

The display unit 60 is configured of, for example, a liquid crystal display.

The operation unit 70 is configured to include a keyboard and a mouse.

The storage unit 80 is configured of, for example, a read only memory (ROM), a random access memory (RAM), a hard disk, and the like. The storage unit 80 stores an influence coefficient matrix K.

As will be described later, the influence coefficient matrix K is a matrix representing an instrumental function for the centrifugal field-flow fractionation device 1, and is calculated by the control unit 30.

The control unit 30 is configured to include a CPU (Central Processing Unit), for example. The control unit 30 can input or output electric signals between the motor 24, the first detection unit 40, the second detection unit 50, the display unit 60, and the operation unit 70. The control unit 30 inputs and outputs data to and from the storage unit 80 as required. When the CPU executes a program, the control unit 30 functions as, for example, a calculation unit 31, a display control unit 32, and a rotation control unit 33.

The calculation unit 31 functions as an influence coefficient matrix calculation unit 311 and an imbalance amount calculation unit 312.

The influence coefficient matrix calculation unit 311 calculates the influence coefficient matrix K based on the detection signal from the first detection unit 40 (the rotation sensor 41) and the detection signal from the second detection unit 50 (the first vibration sensor 51 and the second vibration sensor 52). The influence coefficient matrix calculation unit 311 stores the calculated influence coefficient matrix K in the storage unit 80.

A detection signal of the first detection unit 40 (the rotation sensor 41) and a detection signal of the second detection unit 50 (the first vibration sensor 51 and the second vibration sensor 52) are input to the imbalance amount calculation unit 312. The imbalance amount calculation unit 312 reads the influence coefficient matrix K from the storage unit 80. The imbalance amount calculation unit 312 calculates the imbalance amount of the rotation unit 10 based on the input detection signal and the read influence coefficient matrix K.

The display control unit 32 controls the display on the display unit 60. When the imbalance amount is calculated, the display control unit 32 controls the display on the display unit 60 based on the imbalance amount of the rotation unit 10 calculated by the imbalance amount calculation unit 312. The display control unit 32 also functions as a notification control unit 321. When the imbalance amount of the rotation unit 10 calculated by the imbalance amount calculation unit 312 is equal to or greater than a predetermined amount, the notification control unit 321 controls the display unit 60 to notify the user.

The rotation control unit 33 controls the motor 24 based on the detection signal of the first detection unit 40 (the rotation sensor 41). When the imbalance amount is calculated, the rotation control unit controls the motor 24 based on the imbalance amount of the rotation unit 10 calculated by the imbalance amount calculation unit 312.

6. Correction Operation of Imbalance Amount

Figure 6:
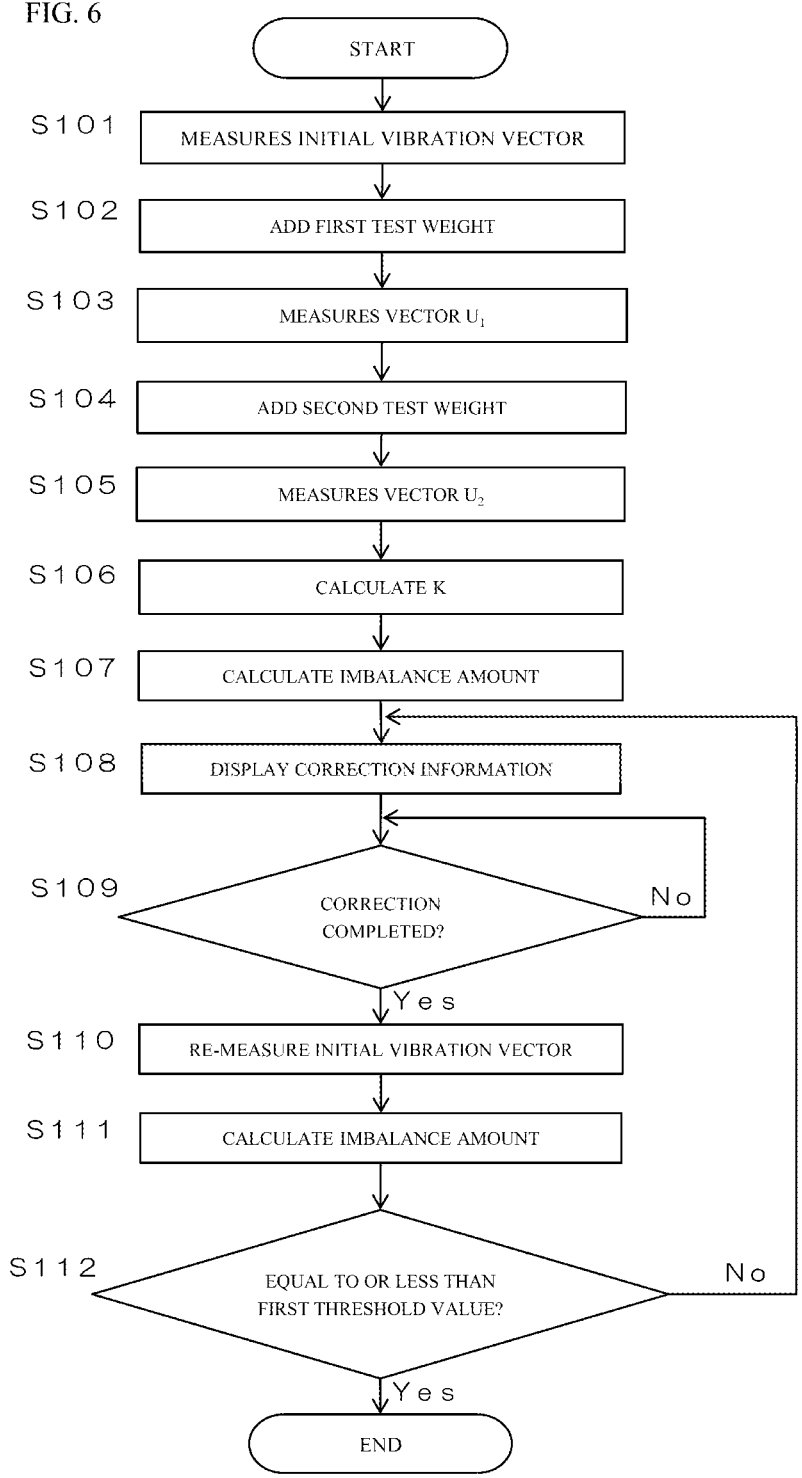
FIG. 6 is a flowchart showing an example of the process at the time of correcting an imbalance amount, which is an example of a process in the centrifugal field-flow fractionation device.

FIG. 6 is a flowchart showing an example of the process at the time of correcting the imbalance amount, which is an example of a process in a centrifugal field-flow fractionation device.

Usually, the imbalance in the rotation unit 10 is corrected before using the centrifugal field-flow fractionation device 1, i.e., when the device is shipped from the factory. Therefore, in the centrifugal field-flow fractionation device 1, the rotation unit 1 is smoothly rotated without causing vibration or noise.

On the other hand, if, for example, the channel member 16 (see FIG. 4) is replaced in the centrifugal field-flow fractionation device 1 from this state, an imbalance occurs in the rotation unit 10. Then, when the rotation unit 10 is rotated in a state where the imbalance occurs in the rotation unit 10, vibration and noise are generated.

Therefore, in the centrifugal field-flow fractionation device 1, when a work that causes an imbalance in the rotation unit 10 is performed, such as when the channel member 16 is replaced, the imbalance is corrected as follows.

Specifically, in the control unit 30 (see FIG. 5), the imbalance amount (dynamic imbalance amount) of the rotation unit 10 is calculated using the following expression (1). A dynamic imbalance is an imbalance in which a static imbalance and a couple imbalance are combined. The static imbalance means, for example, an imbalance generated by shifting the center of gravity parallel to the rotational axis L. The couple imbalance means, for example, an imbalance generated when the center of gravity is on the rotational axis L but the mass center axis is inclined with respect to the rotational axis L.

[Expression 1]

$$\vec{F} + K[\vec{a}_1, \vec{a}_2] = [\vec{U}_1, \vec{U}_2] \quad (1)$$

Here, a vector F is an initial vibration vector generated when the rotation unit 10 is rotated in a state where the rotation unit 10 is not mounted with the first test weight 91, the first correction weight 92, the second test weight 93, and the second correction weight 94 (when the rotation unit 10 is in the initial state), and is a vector measured based on a detection signal of the rotation sensor 41 and a detection signal of the first vibration sensor 51 or the second vibration sensor 52. Specifically, the vector F is a vector measured based on a phase obtained from the detection signal of the rotation sensor 41 and an amplitude obtained from the detection signal of the first vibration sensor 51 or the second vibration sensor 52.

The K is the influence coefficient matrix of the rotation unit 10.

The vector $a_1$ is a vector measured based on the weight and position of the first test weight 91 (see FIG. 4) attached to the rotation unit 10 when the imbalance of the rotation unit 10 is corrected.

The vector $a_2$ is a vector measured based on the weight and position of the second test weight 93 attached to the rotation unit 10 when the imbalance of the rotation unit 10 is corrected.

The "position" means an angular position around the rotational axis L (the same applies to the following).

The vector $U_1$ is a vibration vector which is generated when the rotation unit 10 is rotated after the first test weight 91 is attached to the rotation unit 10, and is measured based on a detection signal of the rotation sensor 41 and a detection signal of the first vibration sensor 51 or the second vibration sensor 52. Specifically, the vector $U_1$ is a vector measured based on a phase obtained from the detection signal of the rotation sensor 41 and an amplitude obtained from the detection signal of the first vibration sensor 51 or the second vibration sensor 52.

The vector $U_2$ is a vibration vector generated when the rotation unit 10 is rotated after the second test weight 93 is attached to the rotation unit 10, and is a vector measured based on a detection signal from the rotation sensor 41 and a detection signal from the first vibration sensor 51 or the second vibration sensor 52. Specifically, the vector $U_2$ is a vector measured based on a phase obtained from the detection signal of the rotation sensor 41 and an amplitude obtained from the detection signal of the first vibration sensor 51 or the second vibration sensor 52.

First, the rotation unit 10 is rotated while the imbalance is generated in the rotation unit 10 (initial state). When the rotational speed of the rotation unit 10 reaches a predetermined value, the influence coefficient matrix calculation unit 311 measures the vector F, which is the initial vibration vector, based on the detection signal from the rotation sensor 41, the detection signal from the first vibration sensor 51, and the detection signal from the second vibration sensor 52 (Step S101). Then, the rotation unit 10 is stopped.

Specifically, the influence coefficient matrix calculation unit 311 measures a vector $F_A$ based on the detection signal from the rotation sensor 41 and the detection signal from the first vibration sensor 51. The influence coefficient matrix calculation unit 311 also measures a vector $F_B$ based on the detection signal from the rotation sensor 41 and the detection signal from the second vibration sensor 52. That is, the influence coefficient matrix calculation unit 311 measures the vectors $F_A$ and $F_B$ as initial vibration vectors. The vector $F_A$ is a matrix consisting of an amplitude calculated from the detection signal of the first vibration sensor 51 and a phase calculated from the detection signal of the rotation sensor 41 as a position at which the amplitude appears. The vector $F_B$ is a matrix consisting of an amplitude calculated from the detection signal of the second vibration sensor 52 and a phase calculated from the detection signal of the rotation sensor 41 as a position at which the amplitude appears.

Thereafter, as shown in FIG. 4, the user attaches the first test weight 91 to a predetermined first hole 143 of the plurality of first holes 143 on the one end face 14A of the rotor 14 (Step S102). Then, the user inputs the weight and position of the first test weight 91 on the display unit 60. The matrix consisting of the weight and position information of the first test weight 91 input at this time becomes the vector $a_1$.

In this state, the rotation unit 10 is rotated. When the rotational speed of the rotation unit 10 reaches a predetermined value, the influence coefficient matrix calculation unit 311 measures the vector $U_1$, which is a vibration vector, based on the detection signal from the rotation sensor 41, the detection signal from the first vibration sensor 51, and the detection signal from the second vibration sensor 52 (Step S103). Then, the rotation unit 10 is stopped.

Specifically, the influence coefficient matrix calculation unit 311 measures a vector $U_{1A}$ based on the detection signal from the rotation sensor 41 and the detection signal from the first vibration sensor 51. The influence coefficient matrix calculation unit 311 measures a vector $U_{1B}$ based on the detection signal from the rotation sensor 41 and the detection signal from the second vibration sensor 52. That is, the influence coefficient matrix calculation unit 311 measures the vector $U_{1A}$ and the vector $U_{1B}$ as the vibration vectors in the state where the first test weight 91 is attached to the roller 41. The vector $U_{1A}$ is a matrix consisting of an amplitude calculated from the detection signal of the first vibration sensor 51 and a phase calculated from the detection signal of the rotation sensor 41 as a position at which the amplitude appears. The vector $U_{1B}$ is a matrix consisting of an amplitude calculated from the detection signal of the second vibration sensor 52 and a phase calculated from the detection signal of the rotation sensor 41 as a position at which the amplitude appears.

Then, the user removes the first test weight from the rotor 14, and further, attaches the second test weight 93 to a predetermined second hole 144 of the plurality of second holes 144 of the other end face 14B of the rotor 14 (Step S104). Then, the user inputs the weight and position of the second test weight 93 on the display unit 60. The matrix consisting of the weight and position information of the second test weight 93 input at this time becomes the vector $a_2$.

In this state, the rotation unit 10 is rotated. When the rotational speed of the rotation unit 10 reaches a predetermined value, the influence coefficient matrix calculation unit 311 measures the vector $U_2$, which is a vibration vector, based on the detection signal from the rotation sensor 41, the detection signal from the first vibration sensor 51, and the detection signal from the second vibration sensor 52 (Step S105). Then, the rotation unit 10 is stopped.

Specifically, the influence coefficient matrix calculation unit 311 measures a vector $U_{2A}$ based on the detection signal from the rotation sensor 41 and the detection signal from the first vibration sensor 51. The influence coefficient matrix calculation unit 311 measures a vector $U_{2B}$ based on the detection signal from the rotation sensor 41 and the detection signal from the second vibration sensor 52. That is, the influence coefficient matrix calculation unit 311 measures the vector $U_{2A}$ and the vector $U_{2B}$ as the vibration vectors in the state where the second test weight 93 is attached to the roller 41. The vector $U_{2A}$ is a matrix consisting of an amplitude calculated from the detection signal of the first vibration sensor 51 and a phase calculated from the detection signal of the rotation sensor 41 as a position at which the amplitude appears. The vector $U_{2B}$ is a matrix consisting of an amplitude calculated from the detection signal of the second vibration sensor 52 and a phase calculated from the detection signal of the rotation sensor 41 as a position at which the amplitude appears.

Then, the influence coefficient matrix calculation unit 311 obtains the following expressions (2) and (3) from the expression (1) and the measured vectors.

[Expression 2]

$$\vec{F}_A + K[\vec{a}_1, \vec{a}_2] = [\vec{U}_{1A}, \vec{U}_{2A}] \quad (2)$$

[Expression 3]

$$\vec{F}_B + K[\vec{a}_1, \vec{a}_2] = [\vec{U}_{1B}, \vec{U}_{2B}] \quad (3)$$

The influence coefficient matrix calculation unit 311 calculates the influence coefficient matrix K by calculation from expressions (2) and (3) (Step S106). The influence coefficient matrix calculation unit 311 stores the calculated influence coefficient matrix K into the storage unit 80.

Next, the imbalance amount calculation unit 312 reads the influence coefficient matrix K from the storage unit 80. The imbalance amount calculation unit 312 performs calculation using the following expressions (4) and (5), based on the expression (1), the measured vectors (initial vibration vectors), and the influence coefficient matrix K.

[Expression 4]

$$\vec{F}_A + K[\vec{X}_1, \vec{X}_2] = [0,0] \quad (4)$$

[Expression 5]

$$\vec{F}_B + K[\vec{X}_1, \vec{X}_2] = [0,0] \quad (5)$$

In the expressions (4) and (5), the vector $a_1$ in the expression (1) is replaced with a vector $X_1$, the vector $a_2$ in the expression (1) is replaced with a vector $X_2$, the vector $U_1$ in the expression (1) is replaced with 0, and the vector $U_2$ in the expression (1) is replaced with 0. That is, the expressions (4) and (5) show that the vibration vector becomes 0 (the imbalance is corrected) when the weight is attached at the position and amount (weight) represented by the vector $X_1$ and the vector $X_2$ with respect to the rotation unit 10 from which the vector $F_A$ and the vector $F_B$, which are the initial vibration vectors, are obtained.

Then, the imbalance amount calculation unit 312 calculates the vector $X_1$ and the vector $X_2$ as dynamic imbalance amounts (imbalance amounts) by calculation (matrix operation) from the expressions (4) and (5) (Step S107).

The display control unit 32 causes the display unit 60 to display imbalance correction information based on the dynamic imbalance amount calculated by the imbalance amount calculation unit 312 (Step S108). On the display unit 60, for example, the position of the predetermined first hole 143 selected from the plurality of first holes 143 and the weight of the first correction weight 92, and the position of the predetermined second hole 144 selected from the plurality of second holes 144 and the weight of the second correction weight 94 are displayed as correction information. In this case, the position of the first hole 143 and the weight of the first correction weight 92 are displayed if there are the first hole 143 at the optimum position for correcting the imbalance and the weight of the optimum first correction weight 92. In addition, if there are not the first hole 143 at the optimum position for correcting the imbalance and the weight of the optimum first correction weight 92, the position of two or more of the first holes 143 that make the optimum combination for correcting the imbalance and the weight of the first correction weight 92 corresponding to them are displayed. Similarly, the position of the second hole 144 and the weight of the second correction weight 94 are displayed if there are the second hole 144 at the optimum position for correcting the imbalance and the weight of the optimum second correction weight 94. In addition, if there are not the second hole 144 at the optimum position for correcting the imbalance and the weight of the optimum second correction weight 94, the position of two or more of the second holes 144 that make the optimum combination for correcting the imbalance and the weight of the second correction weight 94 corresponding to them are displayed.

The user attaches the first correction weight 92 to the designated first hole 143 according to an indication on the display unit 60, and similarly attaches the second correction weight 94 to the designated second hole 144. Then, the user operates the operation unit 70 to input information on correction completion (YES in Step S109).

Next, the rotation unit 10 is rotated. When the rotational speed of the rotation unit 10 reaches a predetermined value, the imbalance amount calculation unit 312 measures (re-measures) the vector F, which is the initial vibration vector after the imbalance correction, based on the detection signal from the rotation sensor 41, the detection signal from the first vibration sensor 51, and the detection signal from the second vibration sensor 52 (Step S110).

Specifically, the imbalance amount calculation unit 312 measures a vector $F_C$ based on the detection signal from the rotation sensor 41 and the detection signal from the first vibration sensor 51. The imbalance amount calculation unit 312 also measures a vector $F_D$ based on the detection signal from the rotation sensor 41 and the detection signal from the second vibration sensor 52. That is, the imbalance amount calculation unit 312 measures the vector $F_C$ and the vector $F_D$ as the initial vibration vectors. The vector $F_C$ is a matrix consisting of an amplitude calculated from the detection signal of the first vibration sensor 51 and a phase calculated from the detection signal of the rotation sensor 41 as a position at which the amplitude appears. The vector $F_D$ is a matrix consisting of an amplitude calculated from the detection signal of the second vibration sensor 52 and a phase calculated from the detection signal of the rotation sensor 41 as a position at which the amplitude appears.

Furthermore, the imbalance amount calculation unit 312 reads the influence coefficient matrix K from the storage unit 80. Then, similarly to the above, the imbalance amount calculation unit 312 performs calculation using the following expressions (6) and (7), based on the expression (1), the measured initial vibration vectors, and the influence coefficient matrix K.

[Expression 6]

$$\vec{F}_C + K[\vec{X}_3, \vec{X}_4] = [0,0] \quad (6)$$

[Expression 7]

$$\vec{F}_D + K[\vec{X}_3, \vec{X}_4] = [0,0] \quad (7)$$

Then, the imbalance amount calculation unit 312 calculates a vector $X_3$ and a vector $X_4$ as dynamic imbalance amounts by calculation (matrix operation) from the expressions (6) and (7) (Step S111).

If the dynamic imbalance amount (weight) calculated by the imbalance amount calculation unit 312 is larger than a preset first threshold value (NO in Step S112), the display control unit 32 causes the display unit 60 to display imbalance correction information based on the dynamic imbalance amount calculated by the imbalance amount calculation unit 312 (Step S108). Then, the operations in and after Step S109 are repeated.

On the other hand, if the dynamic imbalance amount calculated by the imbalance amount calculation unit 312 is equal to or less than a preset first threshold value, the imbalance correction operation is completed (YES in Step S112).

7. Periodic Calculation of Imbalance Amount by Control Unit

Figure 7:
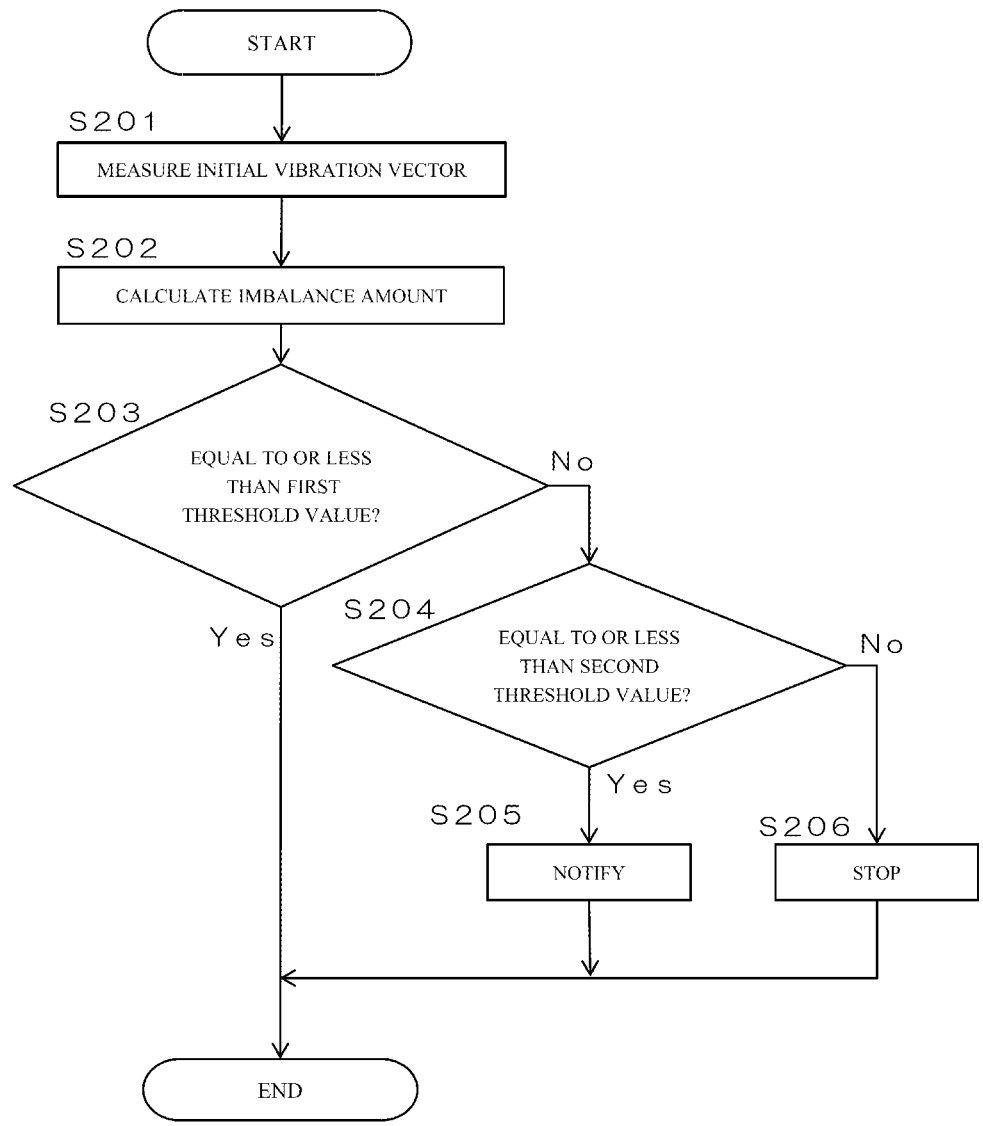
FIG. 7 is a flowchart showing an example of the process performed periodically by the control unit, which is an example of a process in the centrifugal field-flow fractionation device.

FIG. 7 is a flowchart showing an example of the process performed periodically by the control unit, which is an example of a process in a centrifugal field-flow fractionation device.

As a result of continuous use of the centrifugal field-flow fractionation device 1, imbalance may occur in the rotation unit 10 due to deterioration of each member or the like.

Therefore, the centrifugal field-flow fractionation device 1 periodically calculates the imbalance amount.

As shown in FIG. 5, for example, every time a preset period elapses, the imbalance amount calculation unit 312 measures the vector F, which is an initial vibration vector, based on a detection signal from the rotation sensor 41, a detection signal from the first vibration sensor 51, and a detection signal from the second vibration sensor 52 (Step S201).

Specifically, the imbalance amount calculation unit 312 measures a vector $F_E$ based on the detection signal from the rotation sensor 41 and the detection signal from the first vibration sensor 51. The imbalance amount calculation unit 312 also measures the vector $F_F$ based on the detection signal from the rotation sensor 41 and the detection signal from the second vibration sensor 52. That is, the imbalance amount calculation unit 312 measures the vectors $F_E$ and $F_F$ as the initial vibration vectors. The vector $F_E$ is a matrix consisting of an amplitude calculated from the detection signal of the first vibration sensor 51 and a phase calculated from the detection signal of the rotation sensor 41 as a position at which the amplitude appears. The vector $F_F$ is a matrix consisting of an amplitude calculated from the detection signal of the second vibration sensor 52 and a phase calculated from the detection signal of the rotation sensor 41 as a position at which the amplitude appears.

Furthermore, the imbalance amount calculation unit 312 reads the influence coefficient matrix K from the storage unit 80. Then, similarly to the above, the imbalance amount calculation unit 312 performs calculation using the following expressions (8) and (9), based on the expression (1), the measured initial vibration vectors, and the influence coefficient matrix K.

[Expression 8]

$$\vec{F}_E + K[\vec{X}_5, \vec{X}_6] = [0,0] \quad (8)$$

[Expression 9]

$$\vec{F}_F + K[\vec{X}_5, \vec{X}_6] = [0,0] \quad (9)$$

Then, the imbalance amount calculation unit 312 calculates a vector $X_5$ and a vector $X_6$ as dynamic imbalance amounts by calculation (matrix operation) from the expressions (8) and (9) (Step S202).

If the dynamic imbalance amount (weight) calculated by the imbalance amount calculation unit 312 is larger than a preset first threshold value (NO in Step S203), it is further determined whether or not the dynamic imbalance amount is larger than a preset second threshold value.

If the dynamic imbalance amount calculated by the imbalance amount calculation unit 312 is larger than the first threshold value and equal to or less than the second threshold value (YES in Step S204), the notification control unit 321 displays a notification of that effect on the display unit 60 (Step S205). For example, the display unit 60 is caused by the display control unit 32 to display error information, whereby the user is notified that an imbalance has occurred in the rotation unit 10.

If the dynamic imbalance amount calculated by the imbalance amount calculation unit 312 is larger than the second threshold value (NO in Step S204), the rotation control unit 33 stops the motor 24, thereby stopping the rotation of the rotation unit 10 (Step S206).

On the other hand, if the dynamic imbalance amount calculated by the imbalance amount calculation unit 312 is equal to or less than the preset first threshold value (YES in Step S203), the normal operation of the centrifugal field-flow fractionation device 1 is continued. When a set period elapses again, the above operation is performed again.

8. Operations and Effects (1) In the present embodiment, when an imbalance occurs in the rotation unit 10, the imbalance amount calculation unit 312 calculates the imbalance amount based on a detection signal from the rotation sensor 41, a detection signal from the first vibration sensor 51, and a detection signal from the second vibration sensor 52, as shown in FIG. 5. That is, when an imbalance occurs in the rotation unit 10, the imbalance amount can be calculated by the configuration in the centrifugal field-flow fractionation device 1.

Therefore, the imbalance amount can be easily calculated by the centrifugal field-flow fractionation device 1 alone without requiring a separate device or worker.

(2) In the present embodiment, the imbalance amount calculation unit 312 calculates the imbalance amount of the rotation unit 10 based on a phase obtained from the detection signal of the rotation sensor 41 and an amplitude obtained from the detection signal of the first vibration sensor 51 or the second vibration sensor 52.

Therefore, the imbalance amount can be accurately calculated based on the phase and amplitude of the rotation unit 10.

That is, from the relationship between the phase and the amplitude of the rotation unit 10, the imbalance position and amount in the rotation unit 10 can be specified with high accuracy.

(3) In the present embodiment, the imbalance amount calculation unit 312 calculates the imbalance amount of the rotation unit 10 by performing a matrix calculation using the influence coefficient matrix K.

Therefore, the imbalance amount calculation unit 312 can calculate the imbalance amount more accurately.

That is, by performing matrix operation using the influence coefficient matrix K on a matrix representing the relationship between the phase and the amplitude of the rotation unit 10, the imbalance position and amount in the rotation unit 10 can be specified with higher accuracy.

(4) In the present embodiment, as shown in FIGS. 5 and 6, the display control unit 32 causes the display unit 60 to display correction information of the imbalance amount, based on the imbalance amount calculated by the imbalance amount calculation unit 312.

Therefore, the user is allowed to appropriately recognize the correction information of the imbalance amount.

As a result, the user can easily suppress the generation of vibration and noise by performing the work of correcting the imbalance amount according to the correction information displayed on the display unit 60.

(5) In the present embodiment, as shown in FIGS. 5 and 7, when the imbalance amount calculated by the imbalance amount calculation unit 312 exceeds the first threshold value, the notification control unit 321 notifies of that effect by causing the display unit 60 to display that effect.

Therefore, the imbalance amount of the rotation unit 10 can be monitored, and when the imbalance amount exceeds an abnormal value (first threshold value), the user is allowed to appropriately recognize that.

As a result, the user can easily suppress the generation of vibration and noise by correcting the imbalance amount according to the notification.

(6) In the present embodiment, as shown in FIGS. 5 and 7, when the imbalance amount calculated by the imbalance amount calculation unit 312 exceeds the second threshold value, the rotation control unit 33 stops the rotation of the rotation unit 10 by stopping the motor 24.

Therefore, the imbalance amount of the rotation unit 10 can be monitored, and when the imbalance amount exceeds a dangerous value (second threshold value), the rotation of the rotation unit 10 can be automatically stopped.

As a result, it is possible to suppress rotation of the rotation unit 10 while the imbalance amount is very large, and to suppress the rotation unit 10 from being damaged.

(7) In the present embodiment, as shown in FIG. 5, the first detection unit 40 includes at least one rotation sensor 41. The second detection unit 50 includes at least two vibration sensors, specifically, the first vibration sensor 51 and the second vibration sensor 52. The imbalance amount calculation unit 312 calculates the dynamic imbalance amount of the rotation unit 10 as the imbalance amount of the rotation unit 10, based on the detection signal detected by the rotation sensor 41, the detection signal detected by the first vibration sensor 51, and the detection signal detected by the second vibration sensor 52.

Therefore, the dynamic imbalance amount of the rotation unit 10 can be simply calculated by the imbalance amount calculation unit 312.

That is, the dynamic imbalance amount of the rotation unit 10 can be calculated by the simple configuration in which the rotation sensor 41, the first vibration sensor 51, and the second vibration sensor 52 are provided.

9. Second Embodiment (1) Configuration of Storage Unit

In the first embodiment, the influence coefficient matrix K is calculated by the imbalance amount calculation unit 312 and stored in the storage unit 80.

On the other hand, in the second embodiment, the influence coefficient matrix K has been stored in the storage unit 80 in advance.

Specifically, in the second embodiment, the influence coefficient matrix K shown in FIG. 5 is stored in advance in the storage unit 80 when the centrifugal field-flow fractionation device 1 is shipped from the factory.

At this time, the influence coefficient matrix K is calculated by an external device in a factory or the like by performing a similar operation to that is performed by the influence coefficient matrix calculation unit 311 in the first embodiment.

Then, in the centrifugal field-flow fractionation device 1, when a work that causes an imbalance in the rotation unit 10 is performed, the rotation unit 10 is rotated in the same manner as described above, and the vector F, which is the initial vibration vector, is measured (Step S101 of FIG. 6).

Next, in the second embodiment, the imbalance amount calculation unit 312 reads the influence coefficient matrix K stored in the storage unit 80 in advance. The imbalance amount calculation unit 312 performs calculation using the expressions (4) and (5) of the first embodiment, based on the expression (1), the measured vectors (initial vibration vectors), and the influence coefficient matrix K. Then, the imbalance amount calculation unit 312 calculates the vector $X_1$ and the vector $X_2$ as dynamic imbalance amounts by calculation (matrix operation) from the expressions (4) and (5) (Step S107).

Thereafter, similar processing to that in the first embodiment is performed.

Thus, in the second embodiment, since the influence coefficient matrix K is stored in the storage unit 80 in advance, the processing from Step S102 to Step S106 in the first embodiment is omitted.

(2) Operations and Effects of Second Embodiment

In the present embodiment, the influence coefficient matrix K is stored in advance in the storage unit 80 when the centrifugal field-flow fractionation device 1 is shipped from the factory. Then, the imbalance amount calculation unit 312 calculates the imbalance amount of the rotation unit 10 by reading the influence coefficient matrix K stored in advance in the storage unit 80 and performing a matrix calculation.

Therefore, it is not necessary to perform the operation for calculating the influence coefficient matrix K every time the imbalance calculation is performed, and the calculation performed by the imbalance amount calculation unit 312 can be simplified.

In the second embodiment, the influence coefficient matrix K stored in advance in the storage unit 80 may be changed to a new influence coefficient matrix K if the new influence coefficient matrix K is calculated by the similar processing to that in the first embodiment.

10. Third Embodiment (1) Configuration of Second Detection Unit

In the first embodiment described above, the imbalance amount calculation unit 312 calculates the dynamic imbalance amount of the rotation unit 10 as the imbalance amount of the rotation unit 10.

In contrast, in the third embodiment, the imbalance amount calculation unit 312 calculates the static imbalance amount of the rotation unit 10 as the imbalance amount of the rotation unit 10.

Specifically, in the third embodiment, the centrifugal field-flow fractionation device 1 includes either the first vibration sensor 51 or the second vibration sensor 52 shown in FIG. 4, and includes only the first vibration sensor 51 as the vibration sensor, for example.

Then, in the centrifugal field-flow fractionation device 1, when a work that causes an imbalance in the rotation unit 10 is performed, the calculation unit 31 calculates the static imbalance amount as the imbalance amount of the rotation unit 10.

That is, similarly to the first embodiment, the influence coefficient matrix calculation unit 311 measures the vector F, which is the initial vibration vector, based on the detection signal from the rotation sensor 41 and the detection signal from the first vibration sensor 51, and measures the vibration vector with the test weight attached to the rotor 14. The influence coefficient matrix calculation unit 311 calculates the influence coefficient matrix K from the expression (1) and the measured vectors. Thereafter, the imbalance amount calculation unit 312 calculates the static imbalance amount of the rotation unit 10 from the expression (1), the initial vibration vector (the vector F), and the influence coefficient matrix K. Also in the third embodiment, as in the second embodiment, the influence coefficient matrix K may be stored in advance in the storage unit 80.

(2) Operations and Effects of Third Embodiment

In the present embodiment, the first detection unit 40 includes only the first vibration sensor 51 shown in FIG. 4. The imbalance amount calculation unit 312 calculates the static imbalance amount of the rotation unit 10 based on the detection signal from the rotation sensor 41 and the detection signal from the first vibration sensor 51.

Therefore, the static imbalance amount of the rotation unit 10 can be simply calculated by the imbalance amount calculation unit 312.

That is, the centrifugal field-flow fractionation device 1 is usually provided with at least the rotation sensor 41 and the first vibration sensor 51. Hence, by using the rotation sensor 41 and the first vibration sensor 51 in the centrifugal field-flow fractionation device 1, it is not necessary to add a separate component, and the static imbalance amount of the rotation unit 10 can be easily calculated.

However, if the calculation is performed using a detection signal from one vibration sensor, the number of the vibration sensors provided in the centrifugal field-flow fractionation device 1 is not limited to one but may be two or more.

11. Variations

In the explanation of the embodiments described above, the initial vibration vector is measured by rotating the rotor 14 in a normal state and the vector $U_1$ and the vector $U_2$ are measured by rotating the rotation unit 10 in a state where the test weight is attached to the rotor 14. The initial vibration vector may be measured in a state where the test weight is attached to the rotor 14 in advance and the vector $U_1$ and the vector $U_2$ may be measured by rotating the rotation unit 10 in a state where the test weight is removed from the rotor 14.

In the explanation of the embodiments described above, the correction weight is attached to the rotor 14 in order to correct an imbalance of the rotor 14. The correction weight may be attached to the rotor 14 in advance and the correction weight may be removed from the rotor 14 in order to correct the imbalance of the rotor 14. Alternatively, instead of preparing an individual member such as a correction weight, the imbalance may be corrected by, for example, scraping a part of the rotation unit 10.

In the explanation of the embodiments described above, when the imbalance amount of the rotation unit 10 exceeds the first threshold value, the notification control unit 321 notifies of that effect by causing the display unit 60 to display to that effect. When the imbalance amount of the rotation unit 10 exceeds the first threshold value, the notification control unit 321 may notify of that effect by generating a sound.

In the explanation of the embodiments described above, the imbalance amount calculation unit 312 calculates the imbalance amount of the rotation unit 10 by performing a matrix calculation using the influence coefficient matrix K, but the imbalance amount calculation unit 312 may perform calculation using parameters different from the influence coefficient matrix K. The parameters used at this time may be parameters including the amplitude and phase of the rotation unit 10, parameters calculated from the amplitude and phase of the rotation unit 10, or other parameters.

In the explanation of the embodiments described above, the rotation unit 10 is rotated at the time of correcting the imbalance and the rotation speed is maintained at a constant value, but the present invention is not limited thereto and correction of imbalance can be carried out using a wide variety of other methods. For example, the imbalance amount may be calculated at different rotational speeds while changing the rotational speed of the rotation unit 10, and the imbalance may be corrected so that the imbalance amount becomes smallest as a whole in a predetermined range of rotational speed.

DESCRIPTION OF REFERENCE SIGNS

1 centrifugal field-flow fractionation device
10 rotation unit
14 rotor
16 channel member
32 display control unit
33 rotation control unit
40 first detection unit
41 rotation sensor
50 second detection unit
51 first vibration sensor
52 second vibration sensor
60 display unit
80 storage unit
312 imbalance amount calculation unit
321 notification control unit

The invention claimed is:

1. A centrifugal field-flow fractionation device comprising:
   a rotation unit including an annular rotor that rotates about a rotational axis, and a channel member that is provided in the rotor and has therein a channel in which a liquid sample flows;
   a first detection unit that detects a rotational speed of the rotation unit;
   a second detection unit that detects a vibration of the rotation unit; and
   an imbalance amount calculation unit that calculates an imbalance amount of the rotation unit, based on a detection signal of the first detection unit and a detection signal of the second detection unit;
   wherein the imbalance amount calculation unit calculates an imbalance amount of the rotation unit by performing a matrix calculation using an influence coefficient matrix.

2. The centrifugal field-flow fractionation device according to claim 1, wherein the imbalance amount calculation unit calculates an imbalance amount of the rotation unit, based on a phase obtained from a detection signal of the first detection unit and an amplitude obtained from a detection signal of the second detection unit.

3. The centrifugal field-flow fractionation device according to claim 1, further comprising:
   a storage unit that stores an influence coefficient matrix in advance,
   wherein the imbalance amount calculation unit calculates an imbalance amount of the rotation unit by reading the influence coefficient matrix from the storage unit and performing a matrix calculation.

4. The centrifugal field-flow fractionation device according to claim 1, further comprising:
   a display unit; and
   a display control unit that causes the display unit to display, based on an imbalance amount calculated by the imbalance amount calculation unit, correction information of the imbalance amount.

5. The centrifugal field-flow fractionation device according to claim 1, further comprising a notification control unit that, when an imbalance amount calculated by the imbalance amount calculation unit exceeds a first threshold value, notifies that the imbalance amount calculated by the imbalance amount calculation unit exceeds the first threshold value.

6. The centrifugal field-flow fractionation device according to claim 1, further comprising a rotation control unit that stops a rotation of the rotation unit when an imbalance amount calculated by the imbalance amount calculation unit exceeds a second threshold value.

7. The centrifugal field-flow fractionation device according to claim 1, wherein
   the first detection unit includes at least one rotation sensor that detects a rotation speed of the rotation unit,
   the second detection unit includes at least one vibration sensor that detects a vibration of the rotation unit, and
   the imbalance amount calculation unit calculates a static imbalance amount of the rotation unit, based on a detection signal detected by the rotation sensor and a detection signal detected by the vibration sensor.

8. The centrifugal field-flow fractionation device according to claim 1, wherein
   the first detection unit includes at least one rotation sensor that detects a rotation speed of the rotation unit,
   the second detection unit includes at least two vibration sensors that detect a vibration of the rotation unit, and
   the imbalance amount calculation unit calculates a dynamic imbalance amount of the rotation unit, based on a detection signal detected by the rotation sensor and a detection signal detected by the vibration sensor.

* * * * *